(12) United States Patent
Fleming et al.

(10) Patent No.: US 6,624,595 B2
(45) Date of Patent: Sep. 23, 2003

(54) RESONANT ENERGY RECOVERY FOR ELECTRO-LUMINESCENT LAMP PANELS

(75) Inventors: Dan Fleming, Colorado Springs, CO (US); Fernando R. Martin-Lopez, Colorado Springs, CO (US)

(73) Assignee: Toko, Inc. (JP)

( * ) Notice: Subject to any disclaimer, the term of this patent is extended or adjusted under 35 U.S.C. 154(b) by 0 days.

(21) Appl. No.: 09/919,417

(22) Filed: Jul. 31, 2001

(65) Prior Publication Data

US 2003/0025460 A1 Feb. 6, 2003

(51) Int. Cl.$^7$ ................................................ H05B 37/00
(52) U.S. Cl. ..................... 315/224; 315/169.3

(58) Field of Search ............................. 315/169.3, 224

(56) References Cited

U.S. PATENT DOCUMENTS 5,144,203 A * 9/1992 Fujita et al. ............. 315/169.3

* cited by examiner

*Primary Examiner*—David Vu
(74) *Attorney, Agent, or Firm*—William E. Hein (57) ABSTRACT

Circuits and methods employing the inherent capacitance of an electro-luminescent lamp in a resonant circuit to recover the energy otherwise lost in electro-luminescent lamp driver circuits to thereby increase the overall efficiency of such circuits and to lower the noise and increase the life of the electro-luminescent lamp itself.

6 Claims, 9 Drawing Sheets

□ Voltage Across C Lamp    ◇ Voltage On C1

□ Voltage Across C Lamp   ◇ Voltage On C1

Figure 9

□ Voltage Across C Lamp    ◇ Voltage On C1

RESONANT ENERGY RECOVERY FOR ELECTRO-LUMINESCENT LAMP PANELS

FIELD OF THE INVENTION

This invention relates generally to electro-luminescent lamp panels and, more particularly, to a resonant circuit for recovering energy stored in these panels that would otherwise be dissipated during the discharge cycle of a drive circuit.

BACKGROUND AND SUMMARY OF THE INVENTION

Electro-luminescent lamps act as capacitors, electrically. These lamps store energy, as do all capacitors, in the form of an electrical voltage charge. In the normal electro-luminescent lamp driver circuit, this charge is dissipated, and therefore lost, during the discharge cycle of operation.

Figure 1:
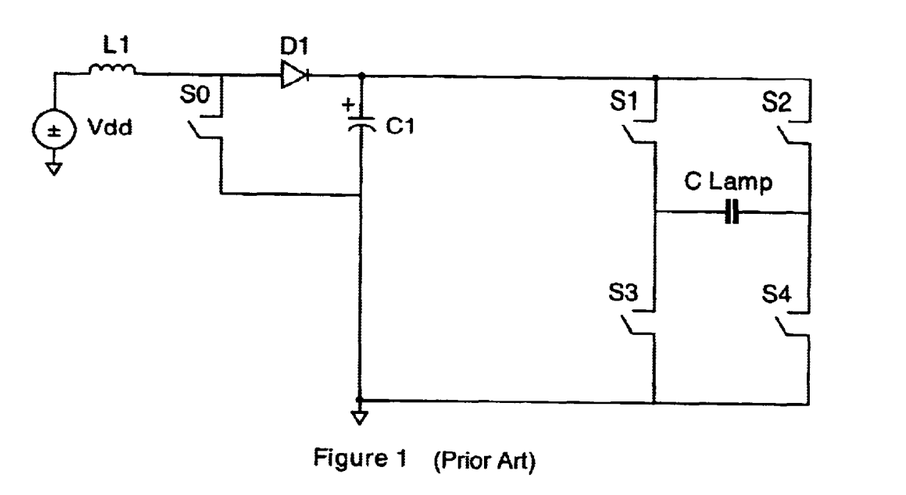
FIG. 1 is a circuit diagram of a typical prior art electro-luminescent lamp driver circuit that is unable to recover charge from the electro-luminescent lamp capacitor.

Electro-luminescent lamp driver circuits are well known in the prior art, exemplary of which are the Supertex HV803 and the Toko TK659XX. A typical one of these circuits is illustrated in FIG. 1. In that circuit, components L1, S0, D1, and C1 constitute a high voltage boost or step-up converter which receives a low voltage (less than 6 volts) and boosts it to between 20 and 100 volts on the capacitor C1. Components S1, S2, S3, and S4 constitute an H-bridge circuit that is used to commutate the high DC voltage on capacitor C1 into a high AC voltage across an electro-luminescent lamp capacitor (C lamp) that is about twice the DC voltage on capacitor C1. This AC voltage charges and discharges the capacitor C lamp, with the energy stored in the capacitor C lamp being dissipated in components S3 and S4 of the H-bridge during the discharge cycle.

It would be advantageous to recover this energy, existing in the form of charge at high voltage, from the electro-luminescent lamp capactior C_lamp, and reuse it, thus making the entire electro-luminescent lamp driving system more efficient. Accordingly, the present invention is directed to a method utilizing capacitor C_lamp in a resonant circuit to implement the recovery of this otherwise lost energy, which is significant in the case of large electro-luminescent lamps that are driven to higher voltages.

DETAILED DESCRIPTION OF THE INVENTION

Figure 2:
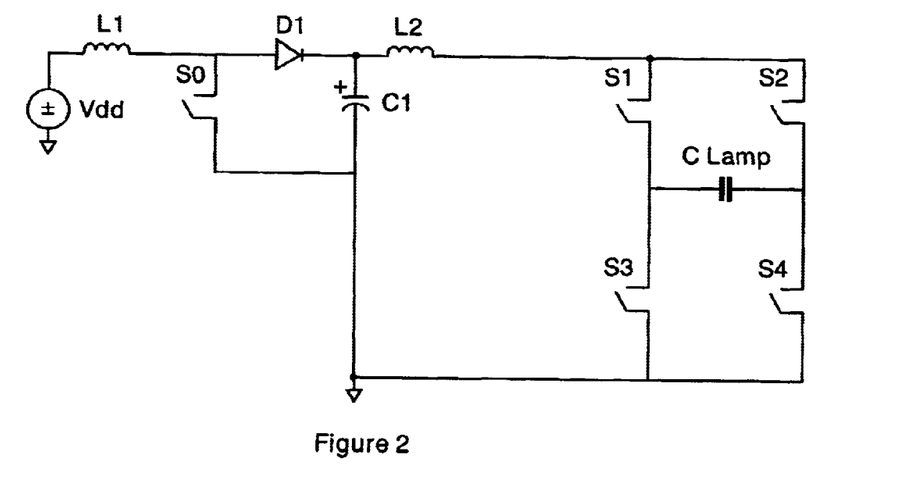
FIG. 2 is a schematic diagram of an electro-luminescent lamp driver circuit employing a series resonant circuit.

Referring now to FIG. 2, there is shown an electro-luminescent lamp driver circuit employing a series resonant method of charge recovery in which a series resonant circuit formed by capacitors C1 and C lamp and inductor L2. Switches S1 and S4 close to connect capacitor C lamp in the resonant circuit, as represented by time t1 in the waveform diagram of FIG. 8. Then, when the voltage on capacitor C lamp is decaying after it reaches its resonant peak, switch S1 opens at time t2 and switch S3 closes at time t3 to quickly complete discharging capacitor C lamp. Next, switch S4 opens at time t4, and switch S2 closes at time t5 to initiate charging, by the resonant circuit, of capacitor C lamp in the opposite direction until the voltage on capacitor C lamp begins decaying after it reaches its resonant peak. Switch S2 opens at time t6, and switch S4 closes at time t7 to quickly complete discharging capacitor C lamp. At this point, the cycle is repeated with switch S3 opening at time t8 and switch S1 closing at time t9. These cycles continue as the step-up power converter, formed by inductor L1, switch S0, diode D1, and capacitor C1, pumps energy into the resonant circuit.

The merits of the resonant charge recovery electro-luminescent lamp driver circuit of FIG. 2 over prior art electro-luminescent lamp driver circuits are three-fold. First, energy from capacitor C lamp is substantially recovered and transferred to capacitor C1 through inductor L2. Second, the voltage on capacitor C lamp is allowed to rise above the voltage on capacitor C1. Third, the waveform of voltage applied to capacitor C lamp is substantially more sinusoidal, which is the preferred waveform for driving an electro-luminescent lamp.

There are many alternative ways in which a resonant circuit can be formed with the capacitor C lamp which represents an electro-luminescent lamp panel. FIGS. 3–7 and 11–14 illustrate just a few additional examples of the ways in which inductive (L) and capacitive (C) elements can be incorporated around the capacitor C lamp to form a resonant circuit. The present invention lies primarily in the recognition that a resonant circuit can be formed with the capacitive element represented by an electro-luminescent lamp panel and that formation of such a resonant circuit can efficiently drive an electro-luminescent lamp panel.

Figure 3:
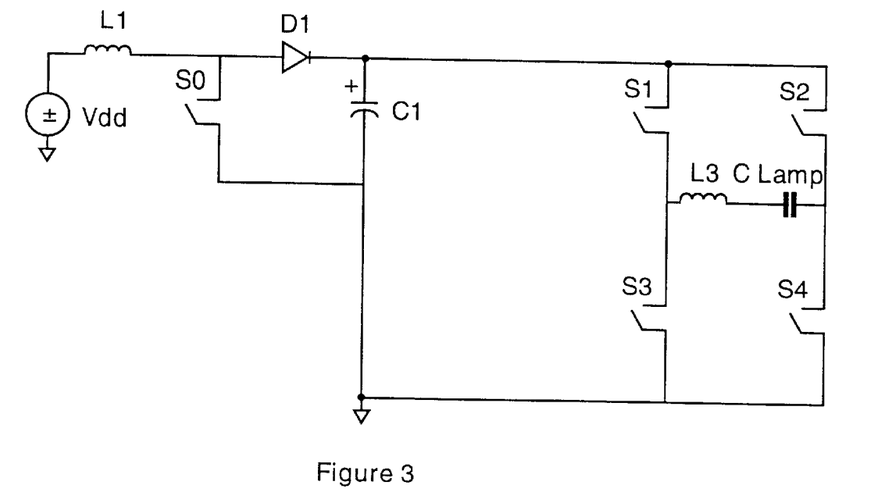
FIG. 3 is a schematic diagram of a first alternative electro-luminescent lamp driver circuit employing a series resonant circuit within an H-bridge circuit.
Figure 4:
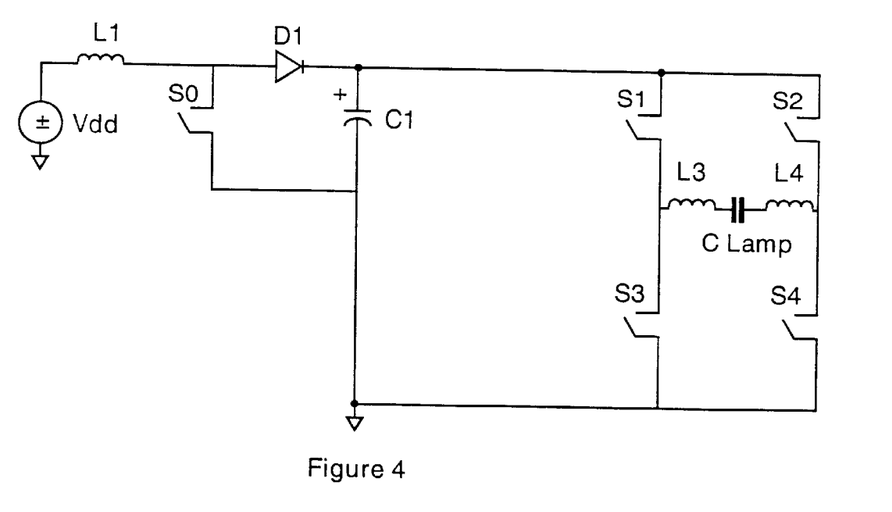
FIG. 4 is a schematic diagram of a second alternative electro-luminescent lamp driver circuit employing a split series resonant circuit within an H-bridge circuit.
Figure 5:
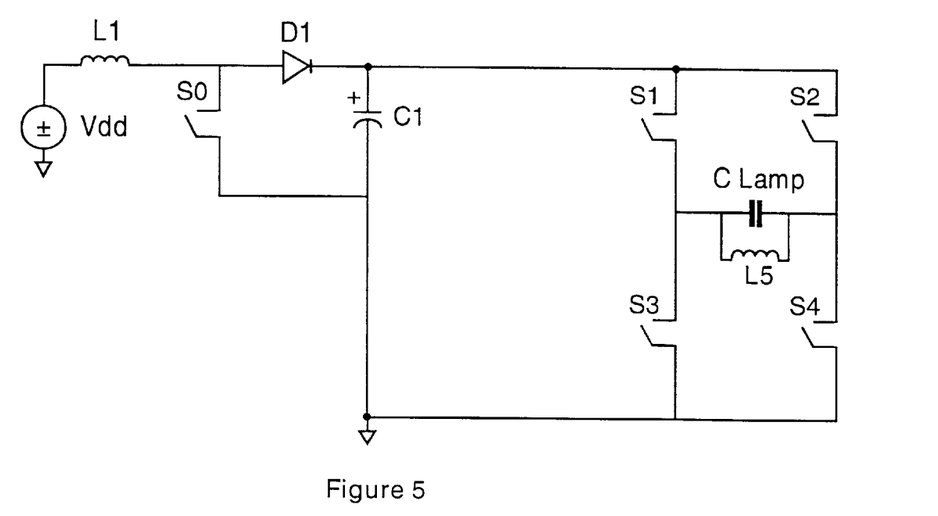
FIG. 5 is a schematic diagram of an electro-luminescent lamp driver circuit employing a parallel resonant circuit within an H-bridge circuit.
Figure 8:
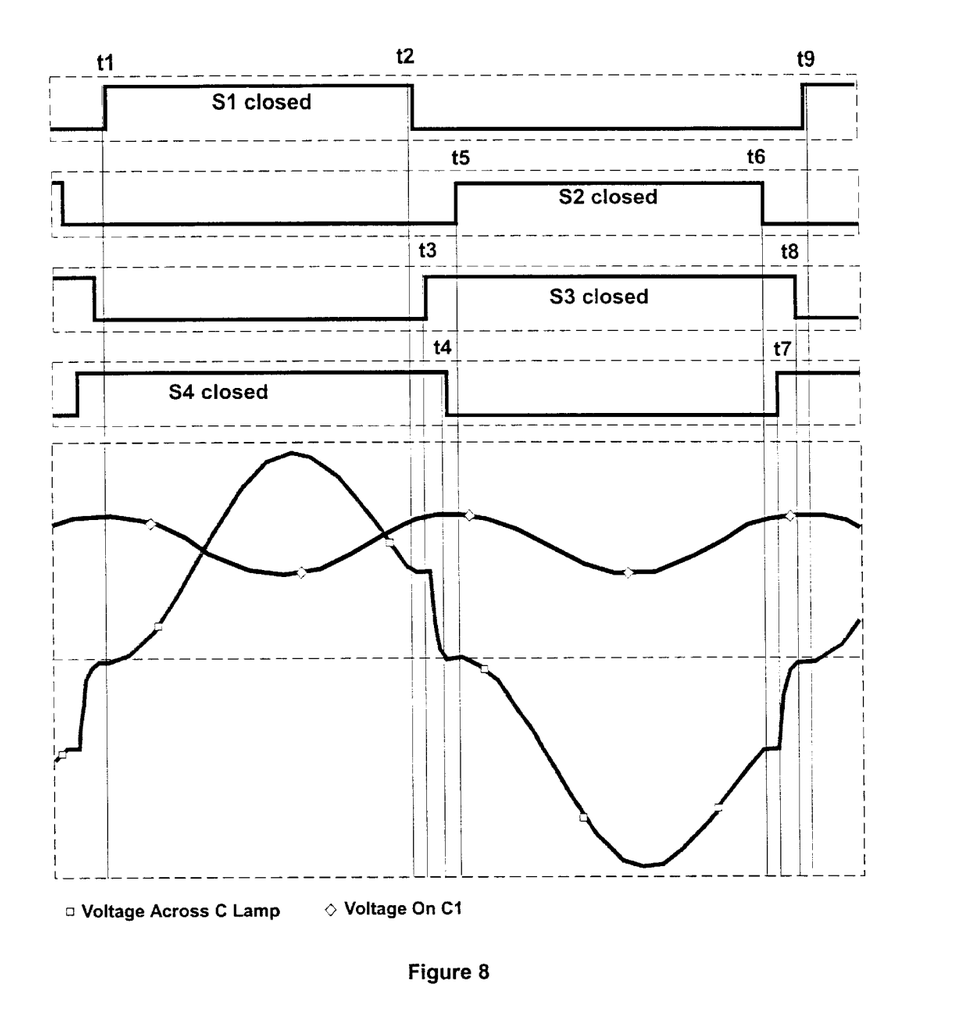
FIG. 8 is a waveform diagram illustrating typical waveforms generated by the electro-luminescent lamp driver circuit of FIG. 2.

Referring now to FIGS. 3–5, there are shown some alternative ways in which a resonant circuit may be formed. They may employ the same H-bridge switch sequencing employing switches S1, S2, S3, and S4 as illustrated in FIG. 8 and as described in connection with FIG. 2.

Figure 9:
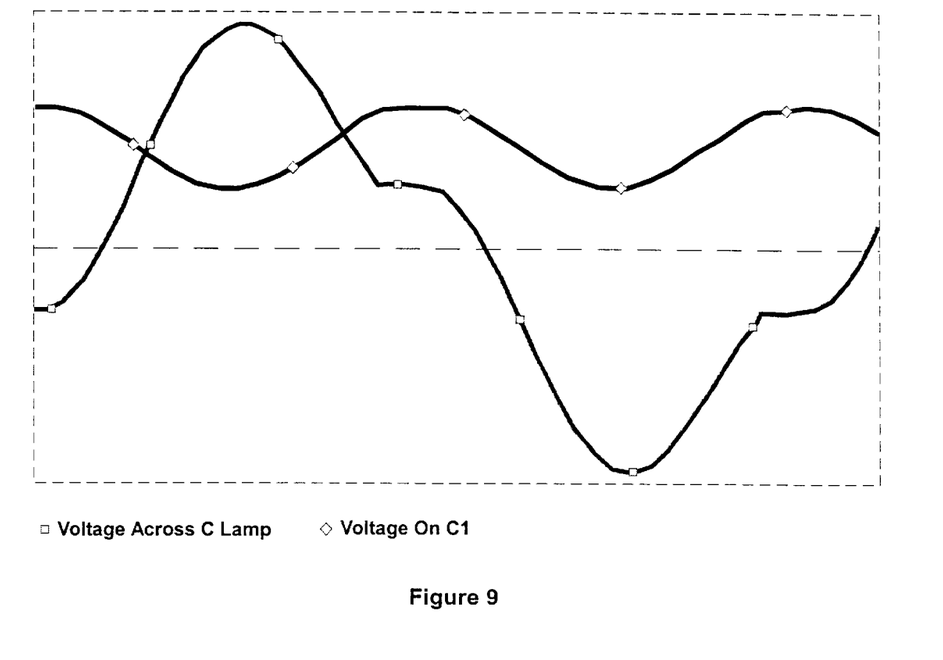
FIG. 9 is a waveform diagram illustrating typical waveforms generated by the electro-luminescent lamp driver circuits of FIGS. 3 and 4.

FIG. 3 shows a series resonant circuit formed by inductor L3 and capacitor C lamp within the H-bridge switches. FIG. 9 illustrates the resulting waveforms of voltage across the capacitor C lamp and voltage on capacitor C1 of this circuit. This waveform is very similar to the waveform of FIG. 8, except that the transitions are more smooth when changing polarity of the voltage being applied across capacitor C lamp. This is an advatageous effect because a more sinusoidal waveform is preferred for driving an electro-luminescent lamp. This effect may be improved somewhat by refining the timing of switches S1, S2, S3, and S4.

The circuit of FIG. 4 is the same as that of FIG. 3, except that inductor L3 has been split into two inductors L3 and L4 such that those two inductive elements are symmetrical about the capacitor C lamp. The waveform resulting from this circuit is also represented by FIG. 9. Therefore, this implementation adds no improvement over the circuit of FIG. 3, unless circuit symmetry is considered important in a particular design.

Figure 10:
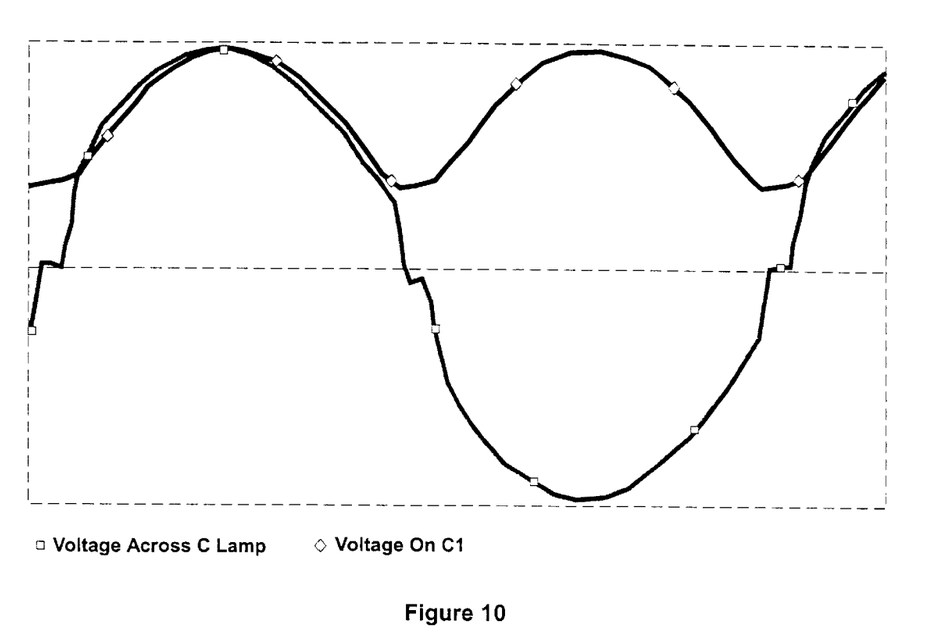
FIG. 10 is a waveform diagram illustrating typical waveforms generated by the electro-luminescent lamp driver circuit of FIG. 5.

FIG. 5 illustrates a parallel resonant circuit formed by inductor L5 and capacitor C lamp within the H-bridge switches. FIG. 10 shows the waveform resulting from this circuit. Although this implementation does not show the advantageous feature of the voltage across capacitor C lamp rising above the voltage on capacitor C1, as in the previously described waveform diagrams, it does produce a more sinusoidal waveform.

Figure 6:
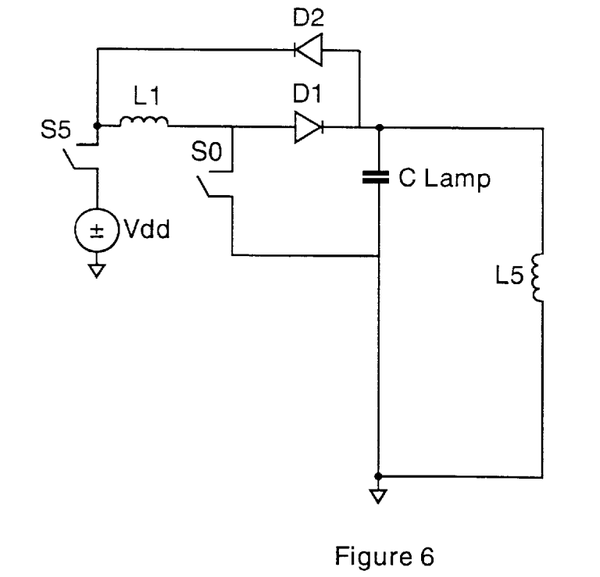
FIG. 6 is a schematic diagram of an alternative electro-luminescent lamp driver circuit employing a parallel resonant circuit.

FIG. 6 illustrates a parallel resonant circuit formed by inductor L6 and capacitor C lamp being fed from a drive circuit like that shown in U.S. Pat. No. 5,313,141. It will therefore be appreciated that the resonant circuits of the present invention may be driven by circuits other than the boost and H-bridge circuits described hereinabove.

Figure 7:
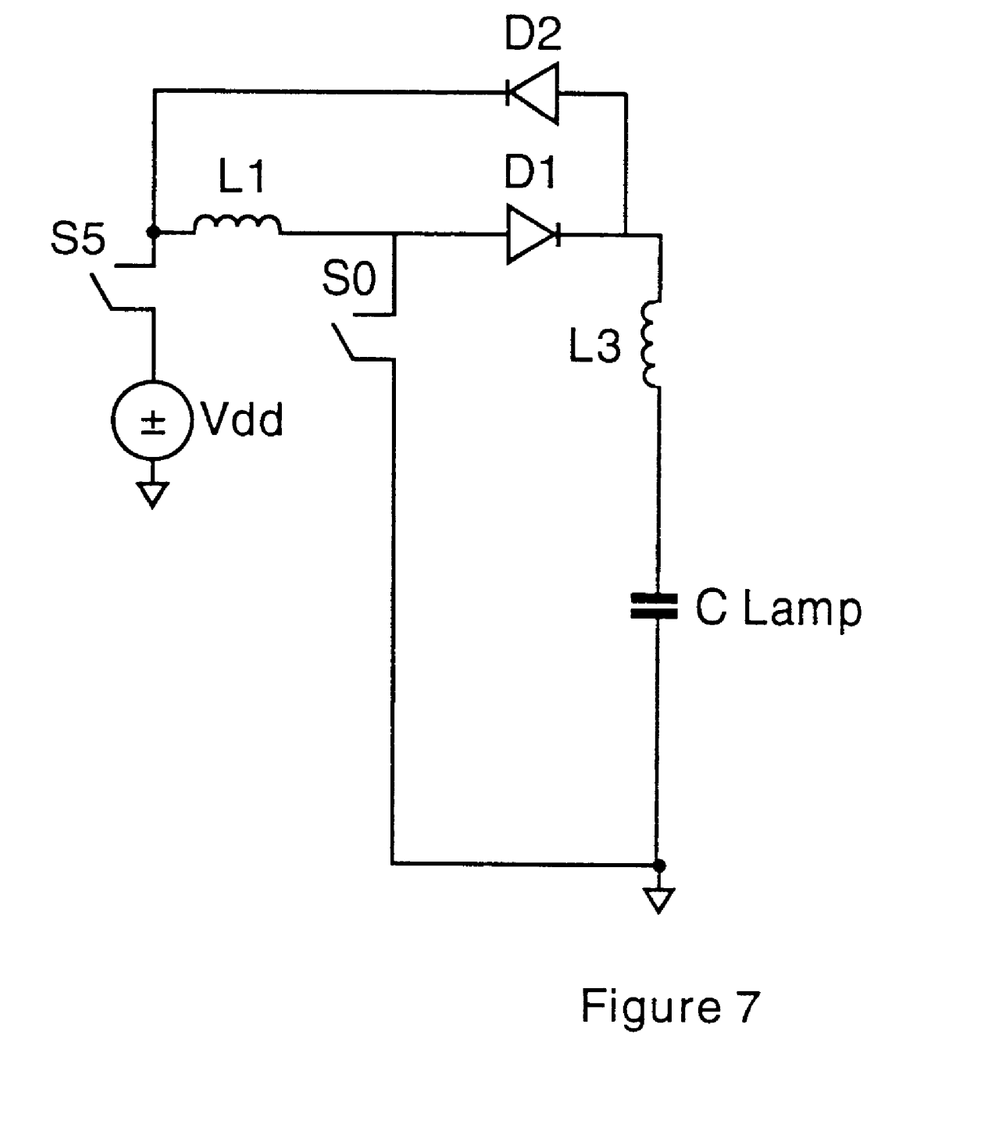
FIG. 7 is a schematic diagram of an alternative electro-luminescent lamp driver circuit employing a series resonant circuit.

FIG. 7 illustrates a circuit similar to that of FIG. 6, except that the parallel resonant circuit of FIG. 6 has been replaced with a series resonant circuit.

Figure 11:
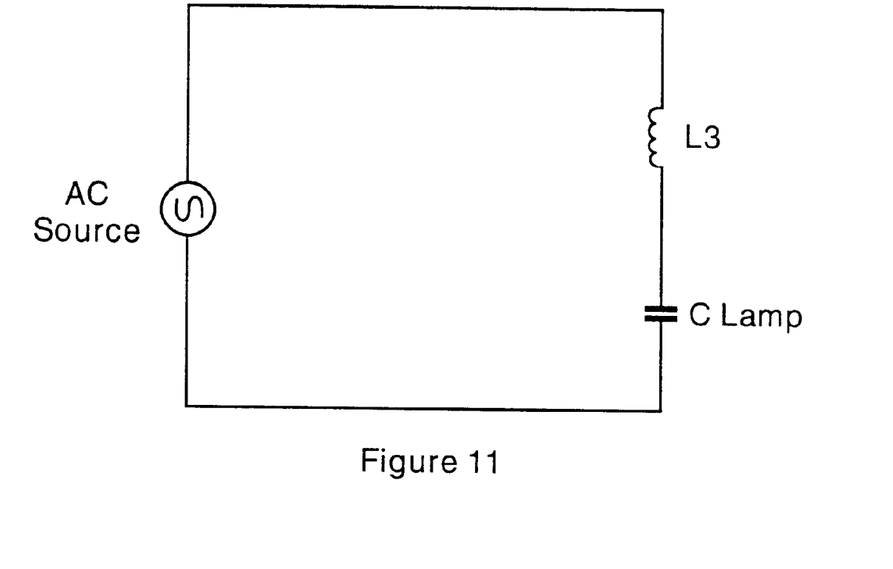
FIG. 11 is a simplified circuit diagram of an electro-luminescent lamp driver like that of FIG. 7, in which a general AC source is employed in place of the step-up converter/inverter.
Figure 12:
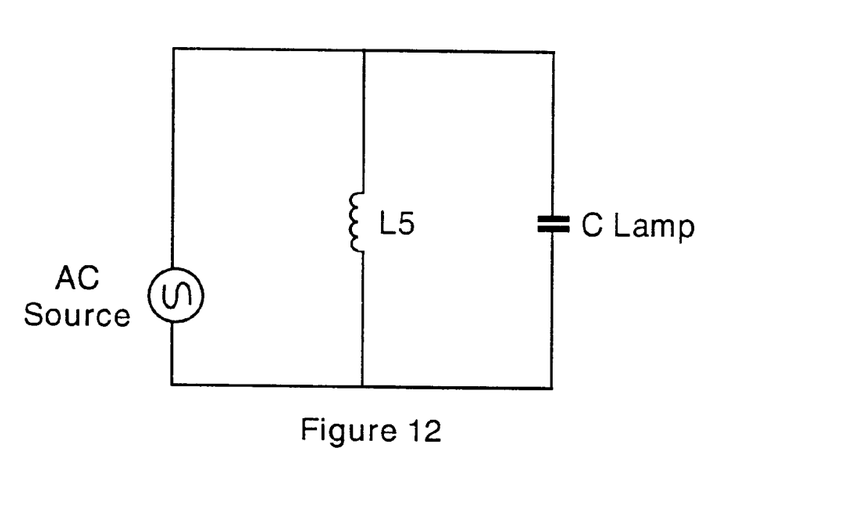
FIG. 12 is a simplified circuit diagram of an electro-luminescent lamp driver like that of FIG. 6, in which a general AC source is employed in place of the step-up converter/inverter.

FIGS. 11 and 12 are simplified circuit diagrams of electro-luminescent lamp drivers like those of FIGS. 7 and 6, respectively, in which a general AC source is employed in place of the step-up converter/inverters of the earlier figures.

Figure 13:
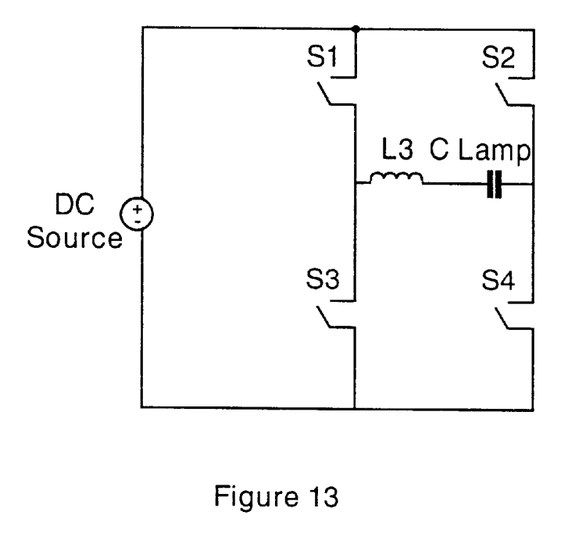
FIG. 13 is a simplified circuit diagram of an electro-luminescent lamp driver like that of FIG. 3, in which a general DC source is employed in place of the step-up converter.
Figure 14:
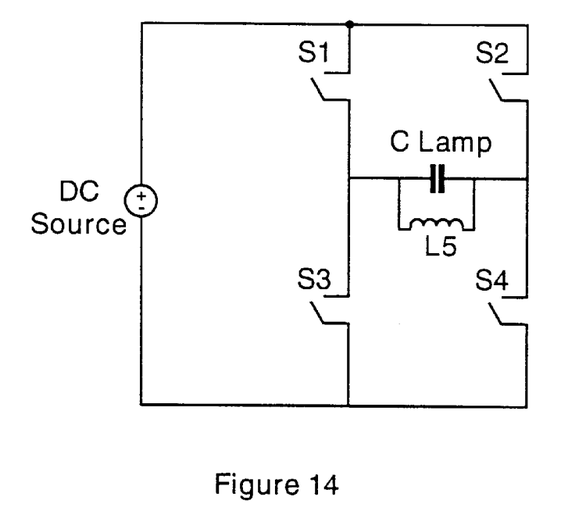
FIG. 14 is a simplified circuit diagram of an electro-luminescent lamp driver like that of FIG. 5, in which a general DC source is employed in place of the step-up converter.

FIGS. 13 and 14 are simplified circuit diagrams of electro-luminescent lamp drivers like those of FIGS. 3 and 5, respectively, in which a general DC source is employed in place of the step-up converters of the earlier figures.

We claim:

1. A method for using an electro-luminescent lamp as a capacitive element in a resonant circuit for recovering and recirculating a portion of the voltage energy stored in the electro-luminescent lamp, the method comprising:

providing an electro-luminescent lamp having an inherent capacitance;

providing storage elements selectively switchably connected to the electro-luminescent lamp to form a resonant circuit therewith; and providing a switched energy source to supply energy to start the resonant circuit and to continue to replace energy lost therein.

2. A method as in claim 1, wherein the storage elements comprise inductive elements.

3. A method as in claim 1, wherein the storage elements comprise simulated reactive elements.

4. A method as in claim 1, wherein the storage elements comprise a combination of inductive, capacitive, and simulated reactive elements.

5. An electro-luminescent lamp driver circuit in which an electro-luminescent lamp forms one of the storage elements of a resonant circuit, comprising:

an electroluminescent lamp having an inherent capacitance;

one or more inductive elements connected to the electro-luminescent lamp to form a resonant circuit therewith, the one or more inductive elements being operative for storing energy and for transferring energy to and from the capacitance of the electro-luminescent lamp;

switching means for selectively connecting and disconnecting the one or more inductive elements to and from the electro-luminescent lamp to thereby initiate transfer of the energy stored in the one or more inductive elements to the capacitance of the electro-luminescent lamp; and a step-up converter connected to the one or more inductive elements and to the switching means, the step-up converter having a capacitive output element and being operative for providing a high DC voltage serving to supply energy to the resonant circuit and to replace lost energy.

6. An electro-luminescent lamp driver circuit as in claim 5, wherein:

the one or more inductive elements and the electro-luminescent lamp are connected to form a parallel resonant circuit; and the switching means is operative for presenting the high DC voltage as a substantially sinusoidal AC voltage across the parallel resonant circuit.

* * * * *